United States Patent [19]

Isobe et al.

[11] Patent Number: 4,635,183

[45] Date of Patent: Jan. 6, 1987

[54] CONTROL UNIT PROVIDED WITH STATUS DISPLAY

[75] Inventors: Shinichi Isobe, Hino; Mikio Yonekura, Hachioji, both of Japan

[73] Assignee: Fanuc Limited, Hino, Japan

[21] Appl. No.: 631,438

[22] PCT Filed: Nov. 21, 1983

[86] PCT No.: PCT/JP83/00416

§ 371 Date: Jul. 12, 1984

§ 102(e) Date: Jul. 12, 1984

[87] PCT Pub. No.: WO84/02205

PCT Pub. Date: Jun. 7, 1984

[30] Foreign Application Priority Data

Nov. 22, 1982 [JP] Japan ................................ 57-203726

[51] Int. Cl.[4] .......................... G05B 11/01; G05B 9/02; G09G 1/06

[52] U.S. Cl. .................................. 364/141; 364/188; 340/722

[58] Field of Search ............... 364/141, 143, 144, 188, 364/189, 191, 192, 193; 340/720, 721, 722, 747; 318/565, 568, 569, 600, 603, 604, 615

[56] References Cited

U.S. PATENT DOCUMENTS

| 3,795,851 | 3/1974 | Gag et al. | 318/604 |
|---|---|---|---|
| 4,222,048 | 9/1980 | Johnson | 340/722 |
| 4,303,973 | 12/1981 | Williamson, Jr. et al. | 364/189 X |
| 4,307,393 | 12/1981 | Hamada et al. | 340/722 |
| 4,364,036 | 12/1982 | Shimizu | 340/722 |
| 4,396,977 | 8/1983 | Slater et al. | 364/188 |
| 4,424,559 | 1/1984 | Lorincz et al. | 364/188 X |
| 4,446,408 | 5/1984 | Ebermann et al. | 318/604 X |
| 4,475,160 | 10/1984 | Inaba | 318/568 |

Primary Examiner—Jerry Smith
Assistant Examiner—Jon D. Grossman
Attorney, Agent, or Firm—Armstrong, Nikaido, Marmelstein & Kubovcik

[57] ABSTRACT

A controller, such as a numerical controller, displays the change with time of input/output statuses or an internal status by a timing chart, to facilitate analysis of the cause of interference concerning signal timing. The controller has a status display unit (22) which includes: a keyboard (25) for inputting desired display data, display data input times, and display data input-inhibit conditions; a timer (26) which generates a clock signal at predetermined timing; a memory (27) which inputs desired display data during an interval of a desired input time in accordance with the conditions set through the keyboard; a display (28) which displays the data input to the memory when the input-inhibit conditions are satisfied; and a processor (29) which controls the memory and the display in synchronism with the clock signal.

6 Claims, 8 Drawing Figures

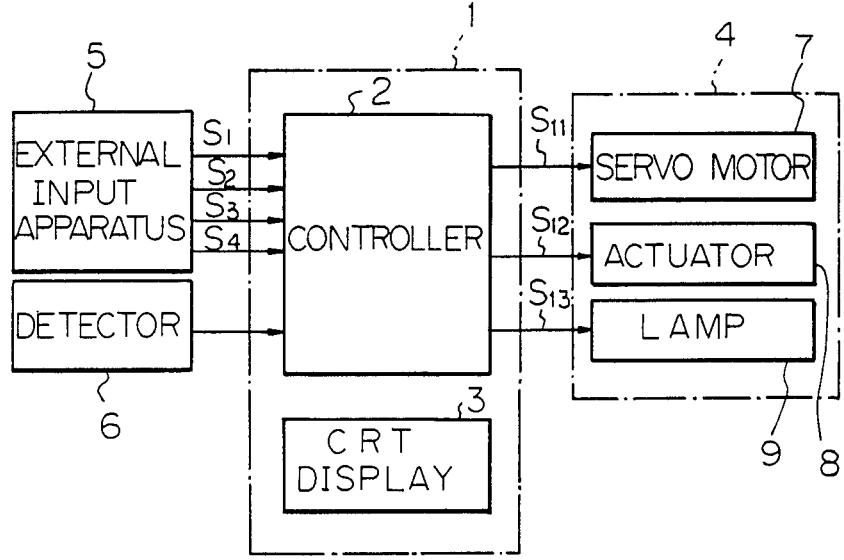

ND STATUS DISPLAY

CONTROL UNIT PROVIDED WITH STATUS DISPLAY

TECHNICAL FIELD

The present invention relates to a control unit provided with a status display showing the input state of signals from external units, the state of internal units, or the output state.

BACKGROUND ART

In general, numerical control units, etc. for automatic machine control or sequential control units or other control units display the input and output state and internal state for diagnosis of components of the units, debugging of control programs, and the like.

In the above-mentioned method of display of conventional control units, the on or off state of output signals are indicated by lights or "1" or "0" are arranged on a CRT display for displaying the input and output states and internal state. Therefore, they only display the current input and output states. To resolve problems relating to timing, however, the operator needs to know the above states over a certain time interval. With the conventional method, where only the current states are displayed, it is difficult to detect by sight the length of on or off times of signals, time gaps between signals, etc. Therefore, conventional status display methods have the disadvantage that they are useless for resolving problems relating to timing.

DISCLOSURE OF THE INVENTION

The object of the present invention, in consideration of the above-mentioned problems in the conventional methods, is to facilitate causal analysis of problems arising from timing of signals in control units, based on the idea of providing the control units with the ability to time-chart and display the changes in the input and output states and internal state of control units over time.

The gist of the present invention, which achieves the above-mentioned object, lies in a control unit having the ability to display the input state of signals from external units, the state of internal units, or the output state, characterized by being provided with a display provided with a keyboard for inputting the desired display content, the intake time of the display content, and the conditions for stopping the intake of the display content, a timer generating a clock signal at predetermined times, a memory for intake of the desired display content at desired intake time intervals in response to conditions set using the keyboard, a display for displaying the data intaken in the memory when the intake stop conditions are met, and a processor for synchronizing and controlling the memory and display by a clock signal.

BRIEF DESCRIPTION OF THE DRAWINGS

The above object and features of the present invention will become more apparent from reading the following description of embodiments made in reference to the attached drawings.

FIG. 1 is a block diagram of a conventional numerical control unit and its peripheral units;

FIG. 2 is an example of its status display;

BEST MODE FOR CARRYING OUT THE INVENTION

Figure 3:
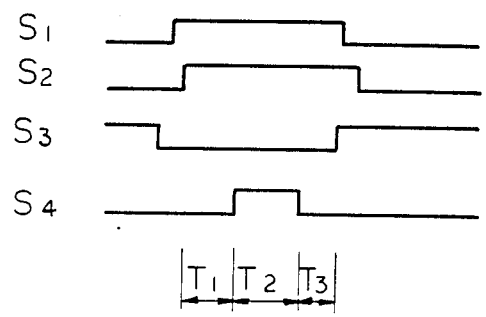
FIG. 3 and FIG. 4 are time charts of one example of input signals in a conventional unit.
Figure 4:
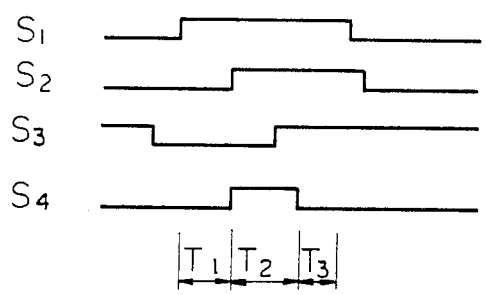

Before describing the embodiments of the present invention, a description will be given of examples of the prior art and their problems in reference to FIGS. 1 to 4.

FIG. 1 is a block diagram of a conventional numerical control unit and its peripheral units. In the figure, a numerical control unit 1 is provided with a controller 2 and a CRT display 3 for status display. In response to signals input from an external input unit 5 and a detector 6 to the numerical control unit 1, for example, a servo motor 7, actuator 8, or lamp 9 in the external output unit 4 is controlled.

Whether or not the input signals $S_1$, $S_2$, $S_3$, and $S_4$ from the external input unit 5 are input to the numerical control unit 1 is displayed for each input signal on, for example, the CRT display 3 as "1" when being input and as "0" when not being input.

Further, whether or not the control signals $S_5$, $S_6$, and $S_7$ from the numerical control unit 1 are being supplied to the servo motor 7, actuator 8, lamp 9, etc. of the external output unit 4 is displayed on, for example, the CRT display 3, for each control signal as "1" when supplied and "0" when not supplied. An example of the display is shown in FIG. 2. In both cases, the display content includes just the current state; the progression of state over time is not displayed. The inconvenience of this is explained by FIGS. 3 and 4.

FIG. 3 is a time chart of one example of the input signals $S_1$ to $S_4$ in the conventional unit of FIG. 1. Here, the numerical control unit 1 reads the state of the input signals $S_1$ to $S_3$ when the input signal $S_4$ is "on". For the numerical control unit 1 to be able to correctly and reliably read the input signals $S_1$ to $S_3$, the input signals $S_1$ to $S_3$ must not change during a predetermined time $T_1$ before the input signal $S_4$ becomes "on", the time while the input signal $S_4$ is "on", and a predetermined time $T_3$ after the input signal $S_4$ becomes "on". Further, for the numerical control unit 1 to be able to obtain the input signal $S_4$, it must be "on" for the above-mentioned predetermined time $T_3$ or more. Consequently, when the input signals $S_1$ to $S_4$ enter at a timing such as in FIG. 4, the input signal $S_1$ is correctly read since it does not change during the predetermined times $T_1$, $T_2$, and $T_3$, but the input signals $S_2$ and $S_3$ may be incorrectly read. Monitoring of signals for timing is clearly impossible or extremely difficult with the prior art of FIG. 1 since the progression of state over time is not shown.

Next, an explanation will be given of an embodiment of the present invention.

Figure 5:
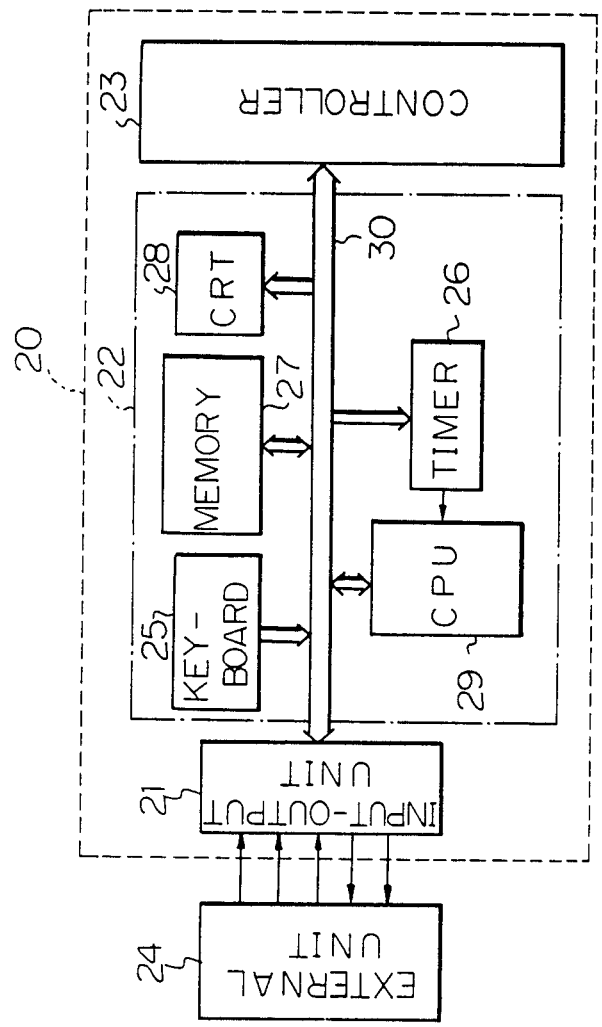
FIG. 5 is a block diagram of a numerical control unit according to a first embodiment of the present invention.

FIG. 5 is a block diagram of a numerical control unit for automatic machine control according to a first embodiment of the present invention. In the figure, a numerical control unit 20 is provided with an input-output unit 21, an input-output status display 22, and a controller 23. The input-output unit 21 is connected to the external unit 24. The input-output unit 21, controller 23, and external unit 24 are the same as in the prior art shown in FIG. 1. However, in FIG. 5, the external input unit and external output unit are expressed as one block. Details are omitted. The input-output unit 21 is an interface of the controller 23 and the external unit 24.

The input-output status display 22 is provided with a keyboard 25, timer 26, memory 27, CRT display 28, and processor 29. The operator sets the following three conditions:

(1) Designation of the correspondence between the input and output signals desired to be displayed and the "lines" on the display, (2) Designation of the intake time interval of the input and output signals desired to be displayed to the memory 27.

(3) Intake stop conditions of the input and output signals desired to be displayed to the memory 27.

When the operator inputs the above three conditions to the keyboard 25, the three conditions are input through the bus 30 to the processor 29. By this, the processor 29 controls the timer 26, memory 27, and CRT display 28 as below. Specifically, the processor 29 sets the time T designated by condition (2) through the bus 30 to the timer 26. The timer 26 generates a clock signal at intervals of the set time T to interrupt the processor 29. During this interruption operation, the processor 29 intakes the state of the signals designated by condition (1) from the input-output unit 21 and stores the intaken data in a fixed region of the memory 27. When the said fixed region on the memory 27 is full with intaken data, the newly intaken data is written over the old data in order from the address of the beginning of the said fixed region. When the conditions designated by condition (3) are met, the processor 29 stops the intake of data from the input-output unit 21 and displays a message on the CRT display 28 showing that the intake of data has been stopped. In this way, data before the time of cessation of data intake is written into the said fixed region of the memory 27. An operator can make a request for data display on the keyboard 25, whereby the data from the input-output unit 21 stored in the memory 27 is displayed on the CRT display continually in the form of a time chart.

Figure 6:
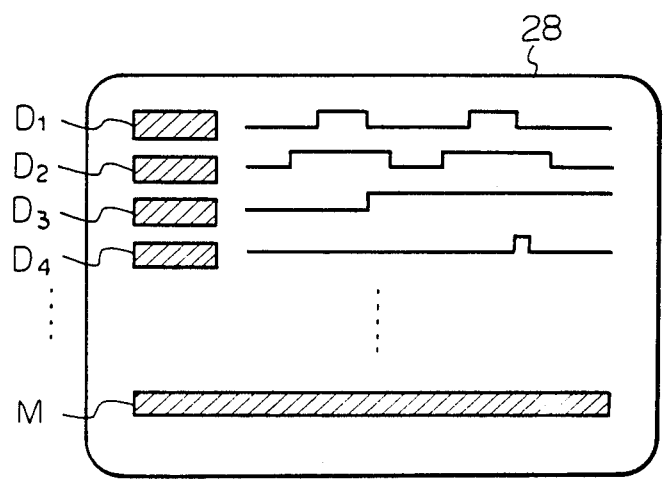
FIG. 6 is a view of one example of a time chart of data displayed by the unit of FIG. 5.

FIG. 6 is a view of one example of a time chart of data displayed by the CRT display 28 by the unit of FIG. 5. In the figure, $D_1, D_2, D_3, D_4$ . . . are portions where words are displayed showing the name of the input and output signals of condition (1) designated at the keyboard 25. On the same lines as these letters, signals are expressed by a time chart. The hatched area M at the bottom of the CRT display 28 is a message displaying in words the signal intake cycle T, intake stop and completion, etc. As can be understood from FIG. 6, since the change of state over time of input and output signals are displayed, monitoring of signals relating to timing is facilitated. Consequently, causal analysis of problems arising from timing is facilitated.

In the above first embodiment, the only signals displayed are the input signals input from the external unit to the control unit and the output signals output from the control unit to the external unit. Further, the display is a digital display showing the "on" or "off" state of the signals. However, the present invention is not limited to this. As shown from the second embodiment below, the internal state of the control unit may also be covered by the display and display of the analog amount is also possible.

Figure 7:
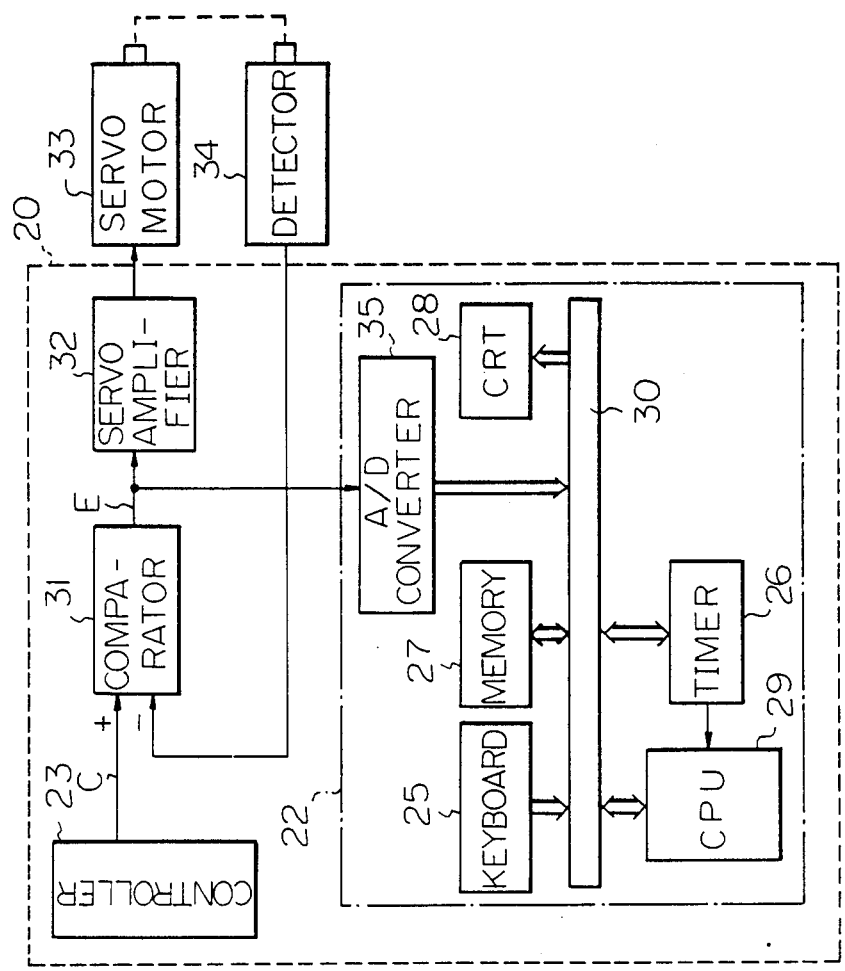
FIG. 7 is a block diagram of a numerical control unit according to a second embodiment of the present invention.

FIG. 7 is a block diagram of a numerical control unit according to a second embodiment of the present invention. The figure shows the feedback system for speed control of a servo motor 33. The construction of the input-output status display 22 itself is the same as that of FIG. 3, except that an analog-digital (A/D) converter 35 is added for converting the analog amount of the display to a digital amount. A comparator 31 compares a command voltage C and detected voltage fed back from a speed detector 34 and applies the difference to a servo amplifier 32. The servo motor 33 is controlled by the output of the servo amplifier 32.

The output E of the comparator 31 shows the deviation from the speed command voltage of the output voltage of the speed detector 34. By showing this deviation on the CRT display 28, effective use can be made of the display content for adjustment of characteristics of the control system. The display method is almost the same as that explained for FIG. 5. Using the keyboard 25, (1) Designation of the correspondence between the input and output signals of the comparator and the "lines" on the display;

(2) Designation of the intake time interval to the memory 27; and (3) Intake stop conditions to the memory 27 are set, whereby the deviation is displayed on the CRT display 28 by analog amount.

Figure 8:
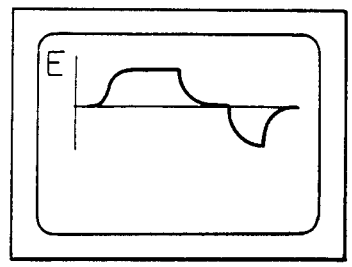
FIG. 8 is a view of one example of a time chart of data displayed by the unit of FIG. 7.

FIG. 8 is a view of one example of a time chart of data displayed on the CRT display 28 by the unit of FIG. 7. In the figure, the aspect of change over time of the output E of the comparator 31 is graphically displayed. Conventionally, a synchroscope or other measuring instrument is connected to the comparator 31 for detection of the deviation. With the above second embodiment, however, no measuring instrument need be connected. Rather, the internal state of the control unit can be graphically shown using the graphic display.

CAPABILITY OF EXPLOITATION IN INDUSTRY

As is clear from the above explanation, according to the present invention, the control unit is provided with the ability to display changes over time of the input and output states and internal state of the control unit as a time chart, whereby causal analysis of problem occurring in timing of signals in the control unit is facilitated. Consequently, the present invention can be conveniently used as a numerical control unit, sequential control unit, or other control unit.

We claim:

1. A control unit for controlling a device, said control unit including a timing analysis means incorporated into said control unit, said timing analysis means comprising:

a keyboard means for specifying desired conditions to be displayed, a desired intake time of said display condition, and a desired intake stop condition of said desired display condition, said desired stop condition being supplied either from an external unit of said control unit or from an internal unit of said control unit;

a timer means, operatively connected to said keyboard means, for generating a clock signal having a frequency determined in response to said intake time;

a memory means, operatively connected to said timer means, to an external unit, and to internal units in said control unit, for intaking, in response to said clock signal from said timer means, said desired conditions to be displayed during a desired intake time interval determined by said desired intake time and said desired intake stop condition, said desired conditions to be displayed being supplied from said external unit or from said internal units;

a display means, operatively connected to said memory means, for displaying, after said intake stop conditions are met, data intaken in said memory means; and a processor means, operatively connected to said keyboard means, said timer means, said memory means, and said display means, for controlling said memory and said display means in synchronization with said clock signal.

2. A control unit according to claim 1, wherein said control unit is a numerical control unit for automatic machine control.

3. A control unit according to claim 2, wherein signals from said external unit are digital signals.

4. A control unit according to claim 2, wherein signals from said external units are analog signals and wherein an analog-digital converter means for converting said analog signals into digital signals and supplying them to said processor is further provided.

5. A control unit according the claim 4, wherein said numerical control unit is for speed control of a servo motor and wherein said control unit further includes said servo motor, a speed detector, a controller for outputting a command voltage, a comparator for comparing detected voltage obtained from the output of said speed detector of said servo motor with said command voltage, and a servo amplifier for controlling the speed of said servo motor based on output of said comparator wherein said comparator, said servo amplifier, said servo motor, and said speed detector form a feedback loop.

6. A control unit according to claim 5, wherein the output of said comparator in said feedback loop is input to said analog-digital converter means.

* * * * *